US010259123B2

(12) United States Patent
Huang

(10) Patent No.: US 10,259,123 B2
(45) Date of Patent: Apr. 16, 2019

(54) VACUUM SUCTION DEVICE

(71) Applicant: Hsin-Po Huang, Taoyuan (TW)

(72) Inventor: Hsin-Po Huang, Taoyuan (TW)

( * ) Notice: Subject to any disclaimer, the term of this patent is extended or adjusted under 35 U.S.C. 154(b) by 0 days.

(21) Appl. No.: 15/911,782

(22) Filed: Mar. 5, 2018

(65) Prior Publication Data

US 2018/0257243 A1 Sep. 13, 2018

(30) Foreign Application Priority Data

Mar. 10, 2017 (TW) .............................. 106203382 U

(51) Int. Cl.
| B25J 15/06 | (2006.01) |
| B25J 15/00 | (2006.01) |
| B29D 11/00 | (2006.01) |
| B65G 47/91 | (2006.01) |

(52) U.S. Cl.
CPC ....... *B25J 15/0625* (2013.01); *B25J 15/0052* (2013.01); *B29D 11/0024* (2013.01); *B65G 47/91* (2013.01)

(58) Field of Classification Search
CPC .............. B25J 15/0625; B25J 15/0052; B29D 11/0024; B65G 47/91
USPC ....................................................... 294/188
See application file for complete search history.

(56) References Cited

U.S. PATENT DOCUMENTS

| 5,561,970 A | 10/1996 | Edie et al. |
| 2006/0247813 A1 | 11/2006 | Takahashi |
| 2010/0303641 A1 | 12/2010 | Medow et al. |
| 2016/0200057 A1 | 7/2016 | Clements et al. |

FOREIGN PATENT DOCUMENTS

| CN | 102990151 A | 3/2013 |
| CN | 105666513 A | 6/2016 |
| CN | 105856210 A | 8/2016 |
| JP | 4-366091 A | 12/1992 |
| JP | 5-48293 A | 2/1993 |
| JP | 11-836 A | 1/1999 |
| JP | 2000-271889 A | 10/2000 |
| WO | WO 2012/014467 A1 | 2/2012 |
| WO | WO 2013/068115 A1 | 5/2013 |

OTHER PUBLICATIONS

Extended European Search Report dated Oct. 31, 2018, for corresponding European Patent Application No. 18160106.3.

*Primary Examiner* — Gabriela M Puig
(74) *Attorney, Agent, or Firm* — Birch, Stewart, Kolasch & Birch, LLP

(57) ABSTRACT

A vacuum suction device has a transfer base, multiple suction heads, a vacuum generator, a pressure balance set, and a first pressure blow set. Each one of the suction heads has at least one channel and a withdraw end. The vacuum generator is connected with a vacuum circuit electromagnetic valve. The first end of the pressure balance set is connected with the channel of each suction head. The second pressure blow set is connected with the third pipe and has a second pressure blow electromagnetic valve, a pressure regulator, and a pressure source. The first pressure blow set is connected to the fourth pipe and has a pressure blow electromagnetic valve and a pressure source.

9 Claims, 6 Drawing Sheets

VACUUM SUCTION DEVICE

BACKGROUND OF THE INVENTION

1. Field of the Invention

The invention relates to a suction device, and more particularly to a vacuum suction device which can remove residual water in a channel of a suction head.

2. Description of Related Art

During process of manufacturing circular sheets, such as contact lenses, an automatic machine may transport the circular sheets from one station to another. During the process of transporting, a suction head of a conventional suction device may suck the circular sheet. The circular sheet should be sunk in liquid during manufacture and before transport. Therefore, the water on the circular sheet has to be removed before the circular sheet is transported.

The conventional suction device cannot release the circular sheet easily since the weight of the circular sheet is too light. Therefore, the conventional suction device would make the process of manufacturing unsmooth.

To overcome the shortcomings of the conventional suction device, the present invention provides a vacuum suction device to mitigate or obviate the aforementioned problems.

SUMMARY OF THE INVENTION

The main objective of the present invention is to provide a vacuum suction device that can remove residual water in a channel of a suction head.

The vacuum suction device has a transfer base, multiple suction heads, a vacuum generator, a pressure balance set, and a first pressure blow set. Each one of the suction heads has at least one channel and a withdraw end. The vacuum generator is connected with a vacuum circuit electromagnetic valve. The first end of the pressure balance set is connected with the channel of each suction head. The second pressure blow set is connected with the third pipe and has a second pressure blow electromagnetic valve, a pressure regulator, and a pressure source. The first pressure blow set is connected to the fourth pipe and has a pressure blow electromagnetic valve and a pressure source.

Other objects, advantages, and novel features of the invention will become more apparent from the following detailed description when taken in conjunction with the accompanying drawings.

DETAILED DESCRIPTION OF PREFERRED EMBODIMENT

Figure 1:
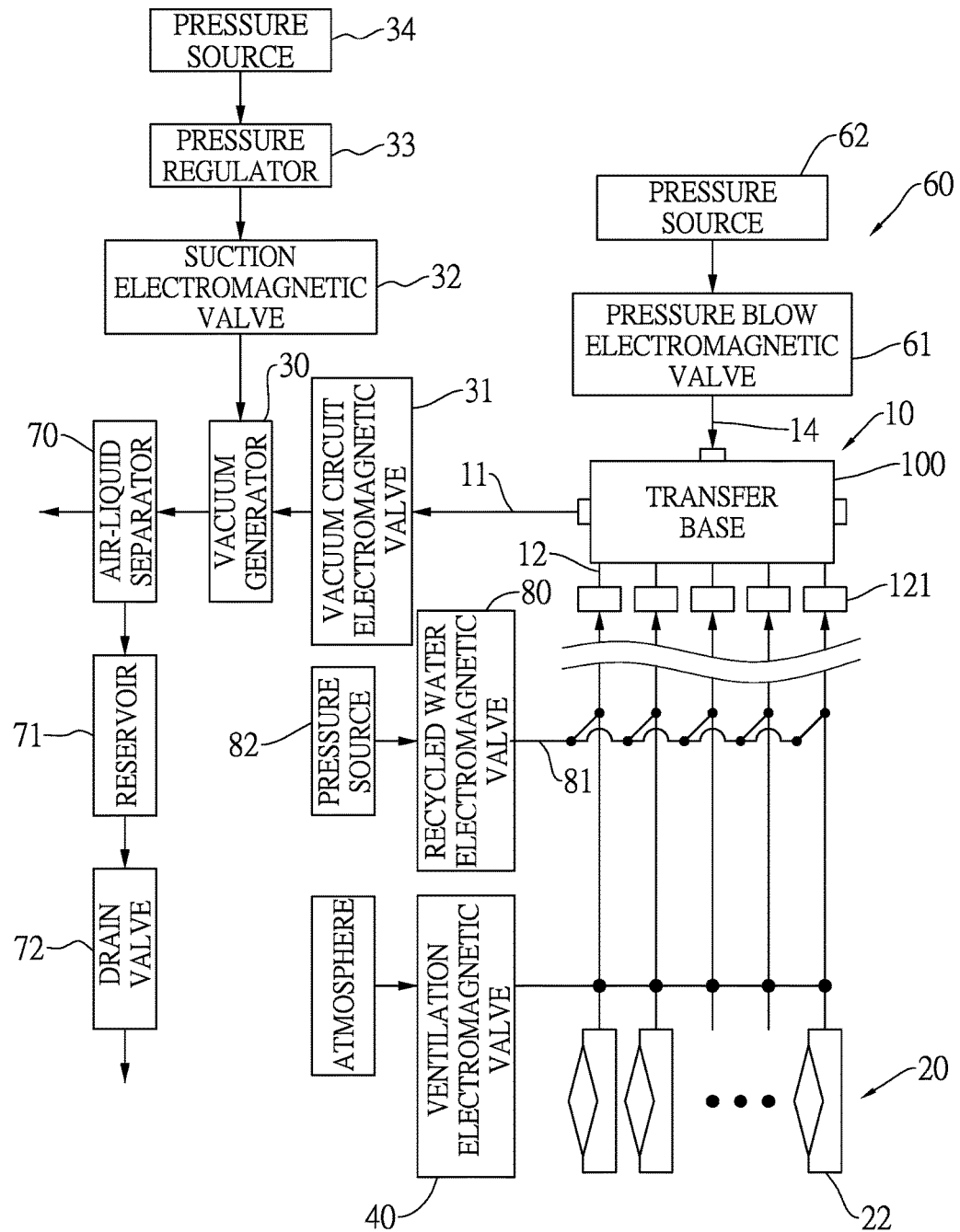
FIG. 1 is a block diagram of a first embodiment of a vacuum suction device in accordance with the present invention.
Figure 2:
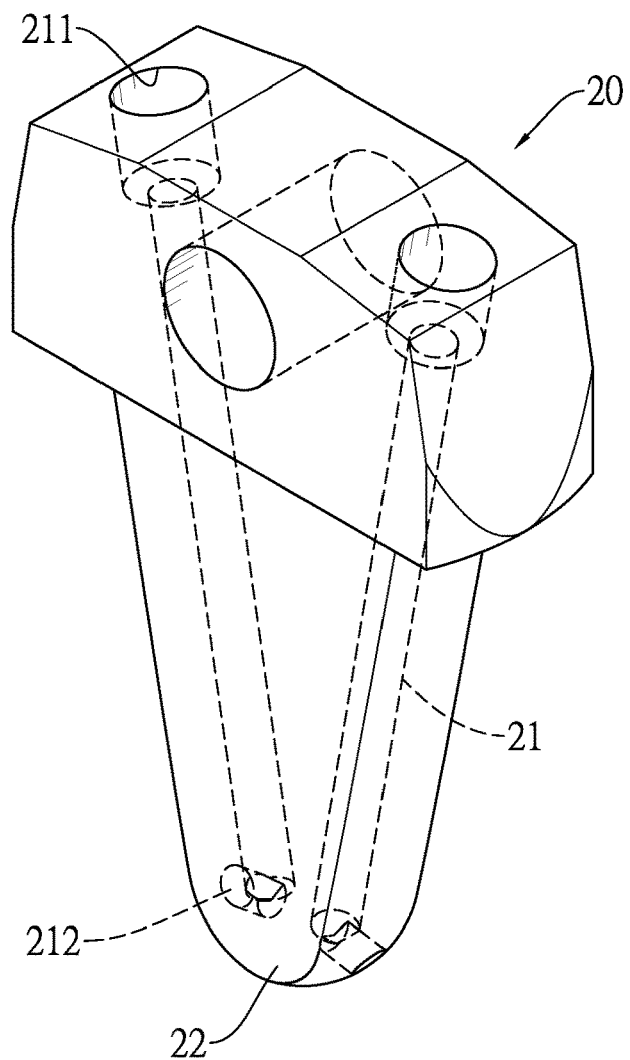
FIG. 2 is a perspective view of the first embodiment of a suction head of the vacuum suction device in FIG. 1.

With reference to FIGS. 1 and 2, a vacuum suction device in accordance with the present invention comprises a transfer base 10, multiple suction heads 20, a vacuum generator 30, a pressure balance set, and a first pressure blow set 60.

Figure 6:
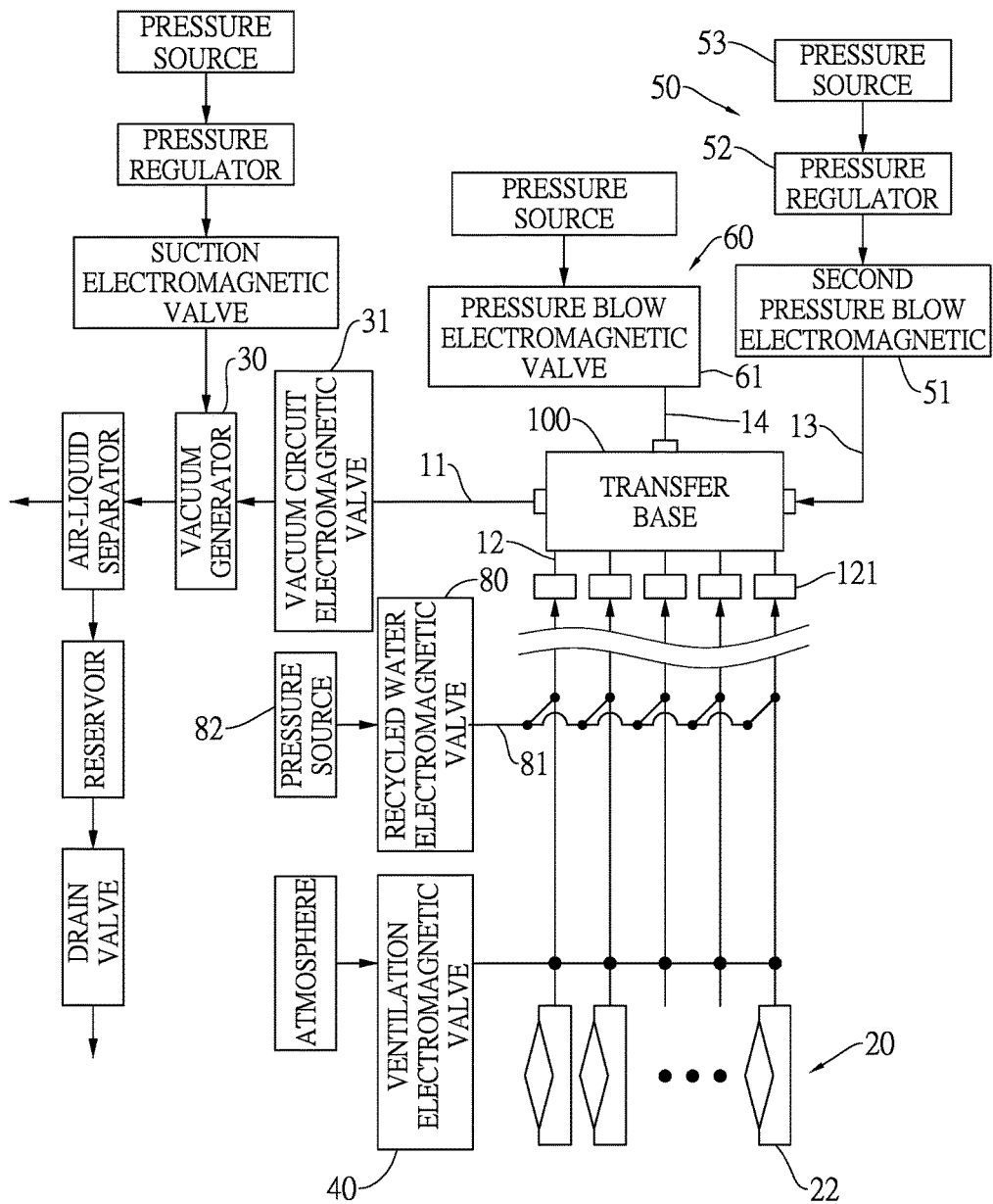
FIG. 6 is a block operational diagram of a second embodiment of the vacuum suction device in accordance with the present invention.

With reference to FIGS. 1 and 6, the transfer base 10 has a base body 100, a first pipe 11, multiple second pipes 12, a third pipe 13, and a fourth pipe 14. The base body 100 has multiple passages. The multiple passages are formed through the base body 100 and communicate with the first pipe 11, the multiple second pipes 12, the third pipe 13, and the fourth pipe 14.

With reference to FIG. 2, each one of the suction heads 20 has at least one channel 21 and a withdraw end 22. Each one of the at least one channel 21 is formed through the suction head 20 and has an upper end, a lower end, an upper air hole 211, and a lower air hole 212. The upper air hole 211 is formed at the upper end of the channel 21. The lower air hole 212 is formed at the lower end of the channel 21. The withdraw end 22 is located adjacent to the lower air hole 212. The upper air hole 211 communicates with the second pipes 12, and the upper air hole 12 communicates with the passages of the base body 100. Furthermore, each one of the second pipes 12 has an electromagnetic valve 121. By turning on or off each electromagnetic valve 121, the suction heads 20 may communicate with or be kept from communicating with the base body 100

The vacuum generator 30 has a first end and second end. The vacuum generator 30 is connected with a vacuum circuit electromagnetic valve 31 with the first end. The vacuum circuit electromagnetic valve 31 is connected with the first pipe 11. When the vacuum generator 30 is actuated and the vacuum circuit electromagnetic valve 31 is turned on, the first pipe 11 and the passages in the base body 100 connected to the first pipe 11 are in a negative pressure state. Furthermore, the vacuum generator 30 is connected with a suction electromagnetic valve 32, a pressure regulator 33, and a pressure source 34. When the pressure source 34 is actuated and the suction electromagnetic valve 32 and the pressure regulator 33 are operated, the vacuum generator 30 may determine the vacuum suction force.

With reference to FIG. 1, the pressure balance set may be a ventilation electromagnetic valve 40. Alternatively, with reference to FIG. 6, the pressure balance set may be a second pressure blow set 50.

With reference to FIG. 1, the ventilation electromagnetic valve 40 has a first end and a second end. The first end of the ventilation electromagnetic valve 40 is connected with the at least one channel 21 of each suction head 20. The second end of the ventilation electromagnetic valve 40 is connected with the atmosphere. The channel 21 of each suction head 20 communicates with the atmosphere when the ventilation electromagnetic valve 40 is turned on. On the other hand, the channel 21 of each suction head 20 does not communicate with the atmosphere when the ventilation electromagnetic valve 40 is turned off.

With reference to FIG. 6, the second pressure blow set 50 is connected with the third pipe 13 and has a second pressure blow electromagnetic valve 51, a pressure regulator 52, and a pressure source 53. The second pressure blow electromagnetic valve 51 has a first end and a second end. The first end of the second pressure blow electromagnetic valve 51 is connected with the third pipe 13. The second end of the second pressure blow electromagnetic valve 51 is connected with the pressure regulator 52 and the pressure source 53.

The second pressure blow electromagnetic valve 51 would be controlled to be opened when the pressure source 53 supplies low pressure air. The low pressure air would enter the passages of the base body 100 via the third pipe 13. Otherwise, the low pressure air would not enter the passages of the base body 100 when the second pressure blow electromagnetic valve 51 is closed.

With reference to FIG. 1, the first pressure blow set 60 is connected to the fourth pipe 14 and has a pressure blow electromagnetic valve 61 and a pressure source 62. The pressure blow electromagnetic valve 61 has a first end and a second end. The first end of the pressure blow electromagnetic valve 61 is connected to the fourth pipe 14. The second end of the pressure blow electromagnetic valve 61 is connected to the pressure source 62. High pressure air would enter the passages of the base body 100 and each channel 21 of each suction head 20 when the pressure source 62 is actuated and the pressure blow electromagnetic valve 61 is opened.

The vacuum suction device further has an air-liquid separator 70. The air-liquid separator 70 is connected to the vacuum generator 30 and has a first end and a second end. The first end of the air-liquid separator 70 is connected to a water reservoir 71 and a drain valve 72. The second end of the air-liquid separator 70 is connected to the atmosphere. Water vapor containing moisture and air output by the vacuum generator 30 enters the air-liquid separator 70. After the separation by the air-liquid separator 70, the moisture enters the water reservoir 71. The drain valve 72 allows the moisture to flow out from the air-liquid separator 70 and the air is vented to the atmosphere.

The vacuum suction device further has a recycled water electromagnetic valve 80. The recycled water electromagnetic valve 80 has a first end and a second end. The first end of the recycled water electromagnetic valve 80 is connected with a branch pipe 81. The second end of the recycled water electromagnetic valve 80 is connected with a pressure source. The branch pipe 81 is connected with a pipe between the electromagnetic valve 121 and each one of the suction heads 20. When the recycled water electromagnetic valve 80 is opened, the remaining water in the second pipe 12 would be transported to the base body 100.

Figure 3:
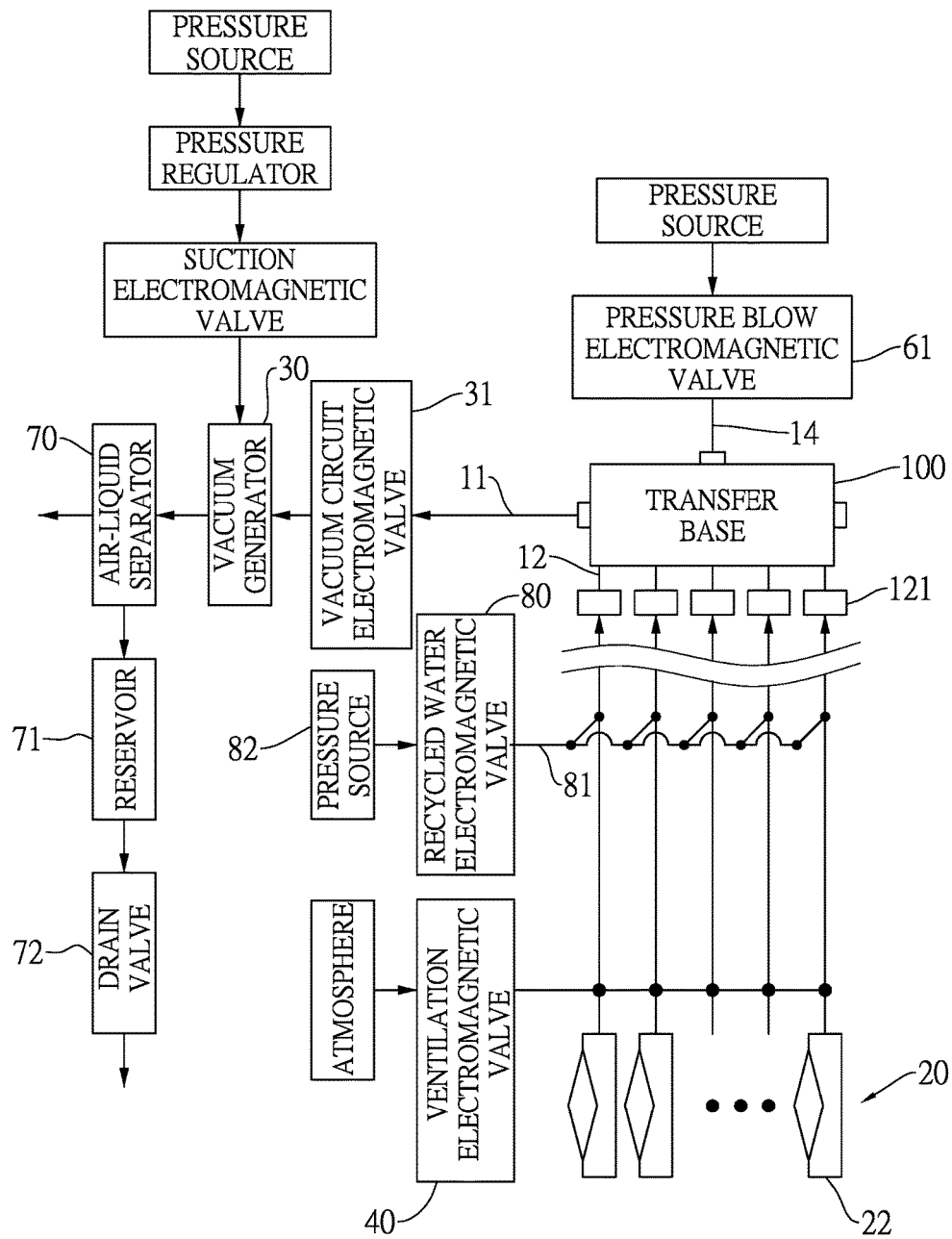
FIG. 3 is an operational block diagram of the first embodiment of the vacuum suction device in FIG. 1.

With reference to FIG. 1, when the vacuum suction device in accordance with the present invention is in use, a circular sheet is disposed in a mounting base. The mounting base is located at a working station. The mounting base is cup-shaped and further contains a cleaner. Each suction head 20 is moved to a position above the mounting base and then descends to contact the circular sheet. With reference to FIG. 3, the ventilation electromagnetic valve 40 and the pressure blow electromagnetic valve 61 are controlled to be closed. The vacuum circuit electromagnetic valve 31 is controlled to be opened, so that the suction force of the vacuum generator 30 may suck and transport the circular sheet by the withdraw end 22.

Each suction head 20 would suck the circular sheet and the cleaner at the same time. The moist would pass through the passages of the base body 100, the first pipe 11, the vacuum circuit electromagnetic valve 31, the vacuum generator 30, and the air-liquid separator 70. The air-liquid separator 70 may separate the air and the water from the moist. The air would flow to the atmosphere, the water would flow into the water reservoir 71, and the drain valve 72 would control whether the water flows into the water reservoir 71 or not.

Figure 4:
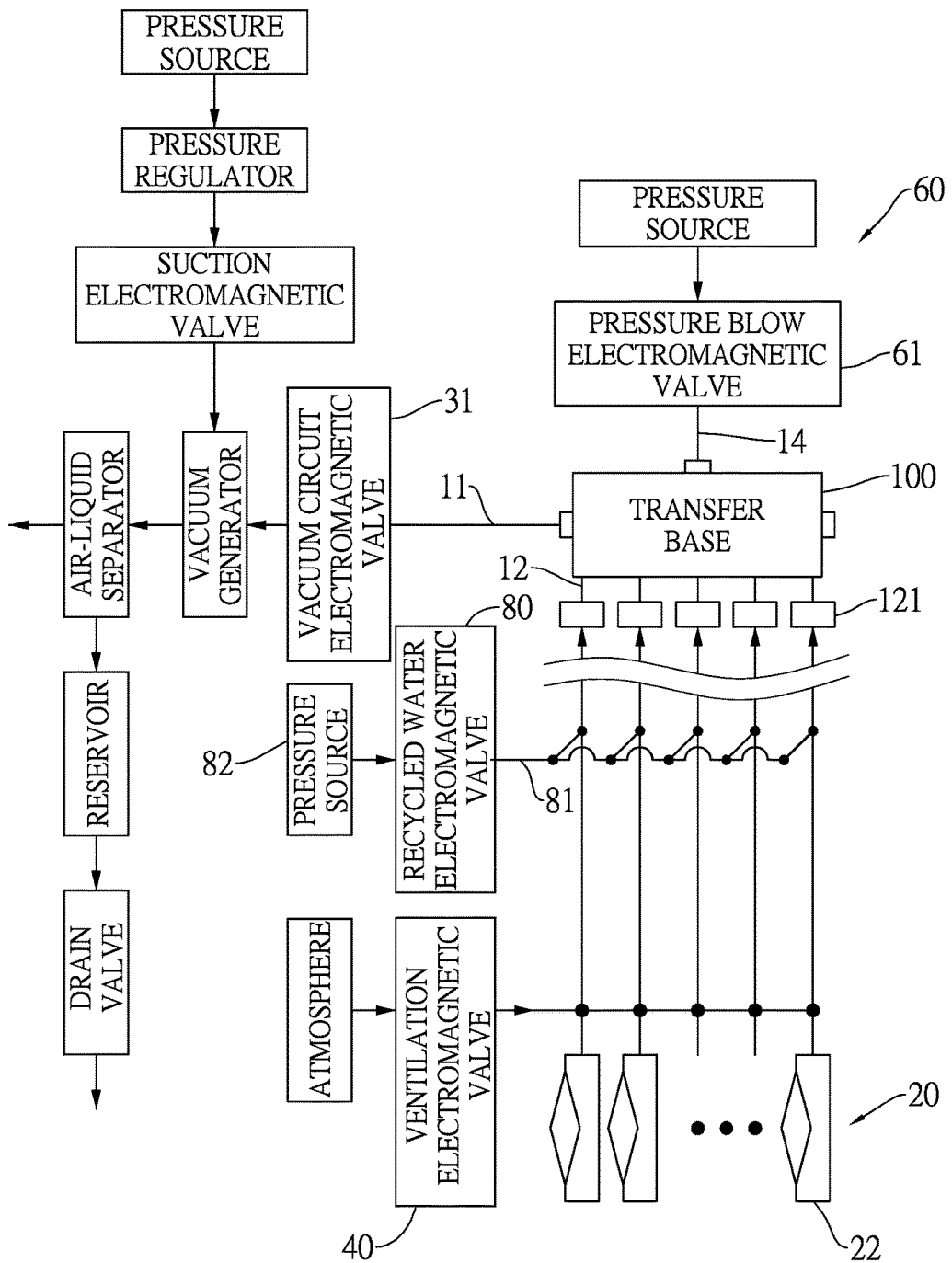
FIG. 4 is another operational block diagram of the first embodiment of the vacuum suction device in FIG. 1.

After the circular sheet is moved to a next working station, with reference to FIGS. 2 and 4, the vacuum circuit electromagnetic valve 31 is controlled to be closed. At the same time, the withdraw end 22 of the suction head 20 does not have any suction force. In the first embodiment of the pressure balance set, the ventilation electromagnetic valve 40 is controlled to be opened, and the outside air can enter the suction head 20 through the channel 21, so that the circular sheet would fall at the working station due to the weight of the circular sheet.

With reference to FIGS. 2 and 6, in the second embodiment of the pressure balance set, the low pressure air is introduced into the second pressure blow set 50. That is, the second pressure blow electromagnetic valve 51 is opened, and the low pressure air provided by the air pressure source 53 flows into the low pressure blow electromagnetic valve 51 and enters the passages of the base body 100 via the pressure regulator 52. The low pressure air would enter the channel 21 of each suction head 20 and enforce the circular sheet to detach from the withdraw end 22, and then the circular sheet falls at the working station.

Figure 5:
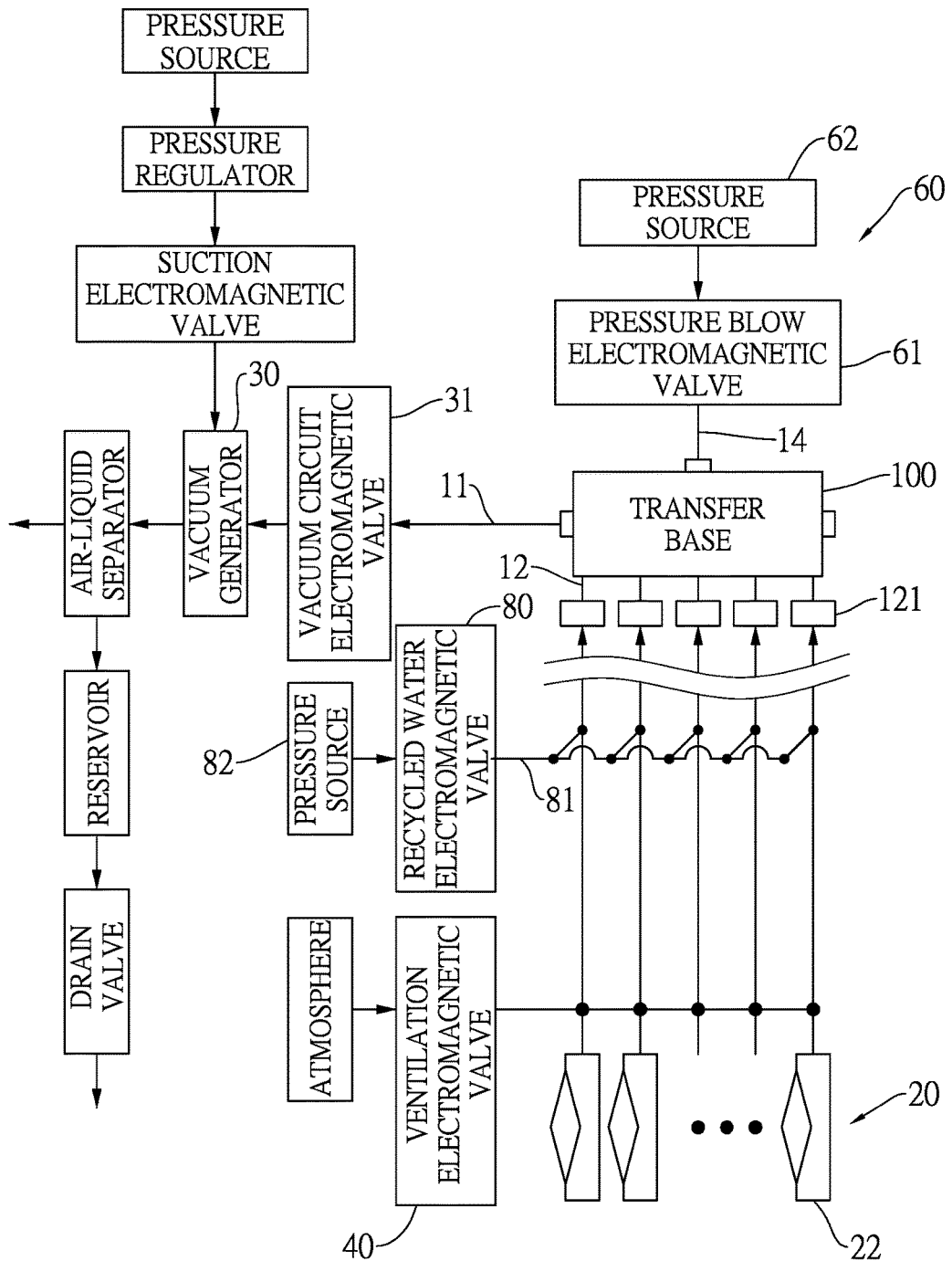
FIG. 5 is another block operational diagram of the first embodiment of the vacuum suction device in FIG. 1.

With reference to FIG. 5, the recycled water electromagnetic valve 80 and the vacuum circuit electromagnetic valve 31 are opened, and the ventilation electromagnetic valve 40, the second pressure blow electromagnetic valve 51, and the pressure blow electromagnetic valve 61 are closed. After the pressure source 82 outputs high pressure air, the high pressure air enters each second pipe 12 via the branch pipe 81. The water in the second pipes 12 may be transported to the base body 100. The high pressure generated from the recycled water electromagnetic valve 80 would force the water in the base body 100 to the air-liquid separator 70 via the first pipe 11 and the vacuum generator 30, and the water in each second pipe 12 may be discharged rapidly.

The electromagnetic valve 121 of each second pipe 12 and the second pressure blow electromagnetic valve 51 are closed, and the first pressure blow set 60 is actuated to make the high pressure air enter the passages of the base body 100 via the fourth pipe 14 and the air-liquid separator 70 via the first pipe 11. The water in the passages of the base body 100, in the second pipes 12, in the third pipe 13, and in the fourth pipe 14 would be transported into the air-liquid separator 70.

When each suction head 20 moves back to the original working station to transfer the next circular sheet, the pressure balance set and the pressure blow electromagnetic valve 61 are controlled to be closed. The vacuum circuit electromagnetic valve 31 is controlled to be closed, and this makes the withdraw end 22 of each suction head 20 have sufficient suction force.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A vacuum suction device comprising:
   a transfer base having
      a base body;
      a first pipe;
      multiple second pipes;
      a third pipe; and
      a fourth pipe, wherein the first pipe, the multiple second pipes, and the fourth pipe communicate with the base body;

multiple suction heads, each one of the suction heads having
at least one channel, each one of the at least one channel having
an upper end;
a lower end;
an upper air hole formed at the upper end of the channel and communicating with one end of the second pipe; and
a lower air hole formed at the lower end of the channel; and
a withdraw end located adjacent to the lower air hole of the suction head;
a vacuum generator having
a first end connected with a vacuum circuit electromagnetic valve of the vacuum generator; and
a second end connected with the first pipe;
a pressure balance set connected with each suction head; and
a first pressure blow set connected with the fourth pipe wherein each second pipe has an electromagnetic valve; wherein the vacuum suction device has a recycled water electromagnetic valve having a first end connected with a branch pipe, and the branch pipe connected with a pipe between the electromagnetic valve and each one of the suction heads; and a second end connected with a pressure source.

2. The vacuum suction device as claimed in claim 1, wherein the pressure balance set is a ventilation electromagnetic valve, and the ventilation electromagnetic valve has
a first end connected to the at least one channel of each suction head; and
a second end connected to an atmosphere.

3. The vacuum suction device as claimed in claim 2, wherein the first pressure blow set has
a pressure blow electromagnetic valve having
a first end connected with the first pipe; and
a second end; and
a pressure source connected with the second end of the pressure blow electromagnetic valve.

4. The vacuum suction device as claimed in claim 2, wherein the vacuum generator is connected with a suction electromagnetic valve, a pressure regulator, and a pressure source; wherein the vacuum generator is connected with an air-liquid separator, the air-liquid separator has a first end and a second end, the first end of the air-liquid separator is connected to a water reservoir and a drain valve, and the second end of the air-liquid separator is connected to the atmosphere.

5. The vacuum suction device as claimed in claim 1, wherein the pressure balance set is a second pressure blow set and has
a second pressure blow electromagnetic valve having
a first end connected with the third pipe; and
a second end;
a pressure regulator connected with the second end of the second pressure blow electromagnetic valve; and
a pressure source connected with the second end of the second pressure blow electromagnetic valve.

6. The vacuum suction device as claimed in claim 5, wherein the first pressure blow set has
a pressure blow electromagnetic valve having
a first end connected with the first pipe; and
a second end; and
a pressure source connected with the second end of the pressure blow electromagnetic valve.

7. The vacuum suction device as claimed in claim 5, wherein the vacuum generator is connected with a suction electromagnetic valve, a pressure regulator, and a pressure source; wherein the vacuum generator is connected with an air-liquid separator, the air-liquid separator has a first end and a second end, the first end of the air-liquid separator is connected to a water reservoir and a drain valve, and the second end of the air-liquid separator is connected to the atmosphere.

8. The vacuum suction device as claimed in claim 1, wherein the first pressure blow set has
a pressure blow electromagnetic valve having
a first end connected with the first pipe; and
a second end; and
a pressure source connected with the second end of the pressure blow electromagnetic valve.

9. The vacuum suction device as claimed in claim 1, wherein the vacuum generator is connected with a suction electromagnetic valve, a pressure regulator, and a pressure source; wherein the vacuum generator is connected with an air-liquid separator, the air-liquid separator has a first end and a second end, the first end of the air-liquid separator is connected to a water reservoir and a drain valve, and the second end of the air-liquid separator is connected to the atmosphere.

* * * * *